United States Patent
Bottene et al.

(10) Patent No.: US 6,883,790 B2
(45) Date of Patent: Apr. 26, 2005

(54) COIL SPRING WITH LATERAL BIAS

(75) Inventors: Marlon V. Bottene, Rochester Hills, MI (US); Joseph A. Fader, Brighton, MI (US); Steven J. Doyle, Jr., Northville, MI (US); Monte G. Williams, Royal Oak, MI (US); Steven G. Saieg, Sterling Heights, MI (US); George N. Lasic, Brampton (CA); Thomas R. King, Milton (CA)

(73) Assignee: ArvinMeritor Technology, LLC, Troy, MI (US)

( * ) Notice: Subject to any disclaimer, the term of this patent is extended or adjusted under 35 U.S.C. 154(b) by 18 days.

(21) Appl. No.: 10/289,038

(22) Filed: Nov. 6, 2002

(65) Prior Publication Data

US 2004/0084821 A1 May 6, 2004

(51) Int. Cl.$^7$ .................................................. F16F 1/06
(52) U.S. Cl. ........................ 267/180; 267/216; 267/221; 267/248; 267/286; 267/167; 267/171
(58) Field of Search ............................ 267/4, 202, 204, 267/216, 221, 222, 224, 225, 248, 254, 34, 286, 288, 166, 166.1, 167, 170, 171, 180; 280/124.145, 124.146, 124.154

(56) References Cited

U.S. PATENT DOCUMENTS

| 3,573,880 | A | * | 4/1971 | Saki |
|---|---|---|---|---|
| 4,779,893 | A | | 10/1988 | Juechter |
| 4,903,985 | A | * | 2/1990 | Muhr et al. |
| 5,622,242 | A | | 4/1997 | Handke et al. |
| 5,957,442 | A | * | 9/1999 | Hensley |
| 6,007,061 | A | | 12/1999 | Kammel et al. |
| 6,024,342 | A | | 2/2000 | Studinger |
| 6,199,882 | B1 | * | 3/2001 | Imaizumi et al. ...... 280/124.146 |
| 6,328,290 | B1 | * | 12/2001 | Imaizumi et al. .............. 267/28 |
| 6,375,174 | B2 | * | 4/2002 | Hasegawa et al. ........... 267/167 |
| 6,460,840 | B2 | * | 10/2002 | Imaizumi et al. ............ 267/286 |
| 6,543,757 | B2 | * | 4/2003 | Imaizumi ..................... 267/179 |
| 6,550,755 | B2 | * | 4/2003 | Ehrhardt et al. |
| 6,616,131 | B2 | * | 9/2003 | Imaizumi ..................... 267/170 |
| 2001/0011791 | A1 | * | 8/2001 | Hasegawa et al. ........... 267/166 |
| 2001/0035601 | A1 | * | 11/2001 | Imaizumi et al. ............ 267/286 |
| 2002/0105127 | A1 | * | 8/2002 | Imaizumi ..................... 267/195 |

FOREIGN PATENT DOCUMENTS

| EP | 1215059 | * | 6/2002 |
|---|---|---|---|
| EP | 1231402 | * | 8/2002 |
| JP | 1320330 | * | 12/1989 |
| JP | 2002178736 | * | 6/2002 |
| JP | 2002234324 | * | 8/2002 |
| WO | WO 02/083437 | * | 10/2002 |

* cited by examiner

Primary Examiner—Robert A. Siconolfi
Assistant Examiner—Devon Kramer
(74) Attorney, Agent, or Firm—Carlson, Gaskey & Olds

(57) ABSTRACT

The invention comprises a vehicle strut assembly. A strut has a first seat mounted to the strut and a second seat mounted to a vehicle body. A spring is mounted between the first seat and the second seat and is disposed around the strut. The spring has a compressed state and an uncompressed state. In the compressed state, the spring has a middle portion that defines a spring centerline. In the uncompressed state, the spring has ends portions extending towards opposite sides of the spring centerline.

12 Claims, 4 Drawing Sheets

COIL SPRING WITH LATERAL BIAS

BACKGROUND OF THE INVENTION

This invention relates to a strut assembly for a motor vehicle.

Strut assemblies for a motor vehicle typically comprise a strut and spring. The strut connects the vehicle frame to a wheel of the vehicle. The spring serves to cushion vibrations experienced by a wheel attached to the strut, while the strut serves to dampen the force experienced by the spring. The spring is frequently a helical coil spring coiled around the strut, which may comprise a rod attached to a piston disposed in a cylinder, such as a McPherson strut. The rod telescopes relative to the cylinder.

As a consequence of forces from the road on the wheel and the positioning of the strut relative to the wheel and vehicle, the strut may experience a force lateral to the direction of the telescoping movement between the rod and cylinder. This force creates friction at the sealing interface between the rod and cylinder, causing the strut to telescope in less than optimal fashion.

One way of solving this problem is to shape the coil spring in the form of a c-shaped curve. The spring is shaped in this way to create a force to offset force at the sealing interface. However, this particular design may make the spring less responsive to road shocks along the strut.

A need therefore exists for a strut assembly that offsets the lateral forces experienced at the sealing interface of the strut without losing spring responsiveness along the direction of the strut.

SUMMARY OF THE INVENTION

The present invention provides a lightweight, compact and low cost assembly to offset lateral forces experienced by a strut. The strut assembly comprises a strut, such as a McPherson strut, having two seats for a spring. The first seat may be mounted to the strut while the second seat may be operatively mounted to a vehicle body. Between the first seat and the second seat is sandwiched a spring. The spring has a compressed state and an uncompressed state. In the compressed state, the spring has three portions and defines a center axis or centerline.

When the spring is in the uncompressed state, one end of the spring angles from a middle portion on an opposite side of the spring centerline from the other end. This end of the spring creates a force lateral to the spring centerline in a direction opposite to the force created through the wheel. The first end and second end may also combine to create a net force lateral to the direction of extension of the strut. This force may offset the lateral force experienced by the strut.

The strut may comprise a rod and piston disposed in a cylinder. The strut may have a sealing interface between the rod and the cylinder and may extend along a line with the spring. The spring may be a helical coil spring. Due to the bias of the spring in the compressed state, the spring may create a force lateral to the line of extension of the strut. Friction at the sealing interface is accordingly minimized without the size or weight of a heavier spring. Additionally, because the spring is not C-shaped, it may retain greater responsiveness to shocks experienced along the line of extension of the strut.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
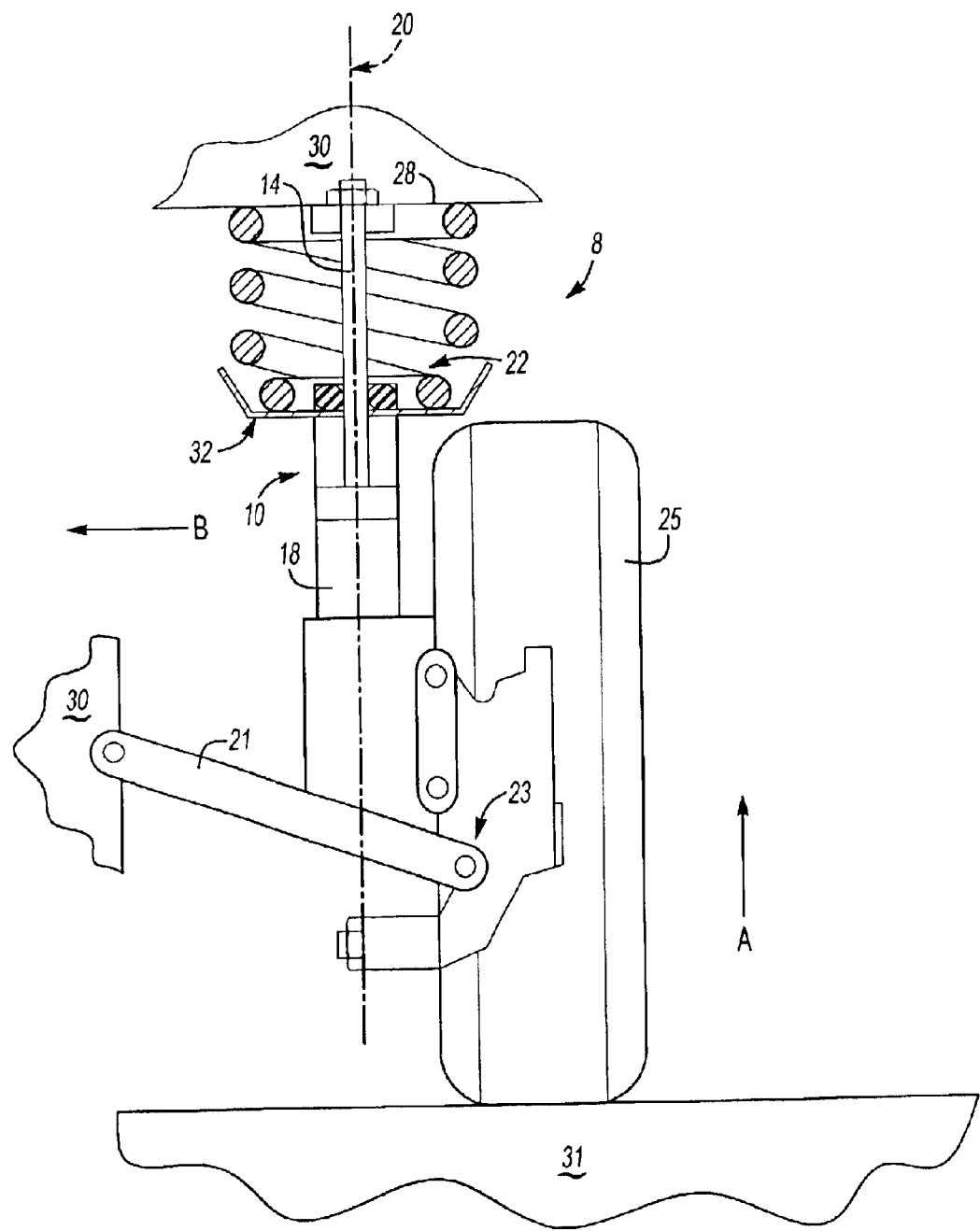
FIG. 1 illustrates the inventive strut assembly.

FIG. 1 illustrates the inventive strut assembly 8. As shown, strut 10, here a McPherson strut, comprises rod 14 attached to a piston nested within cylinder 18. Rod 14 is sealed at sealing interface 22 as known. Rod 14 is operatively connected to vehicle body 30 and telescopes along axis 20 relative to cylinder 18. Cylinder 18 is connected to control arm 21 at knuckle 23. Control arm 21 is ultimately connected to vehicle body 30. Wheel 25 is connected to strut 10 and control arm 21.

During movement of the vehicle, wheel 25 experiences an upward force along arrow A from ground 31 caused by the weight of the vehicle. Due to geometry of the structure, a lateral force is created along arrow B at sealing interface 22. This lateral force may cause rod 14 to stick in its movement relative to cylinder 18 at sealing interface 22. As a consequence, rod 14 may not oscillate smoothly along axis 20.

Figure 2:
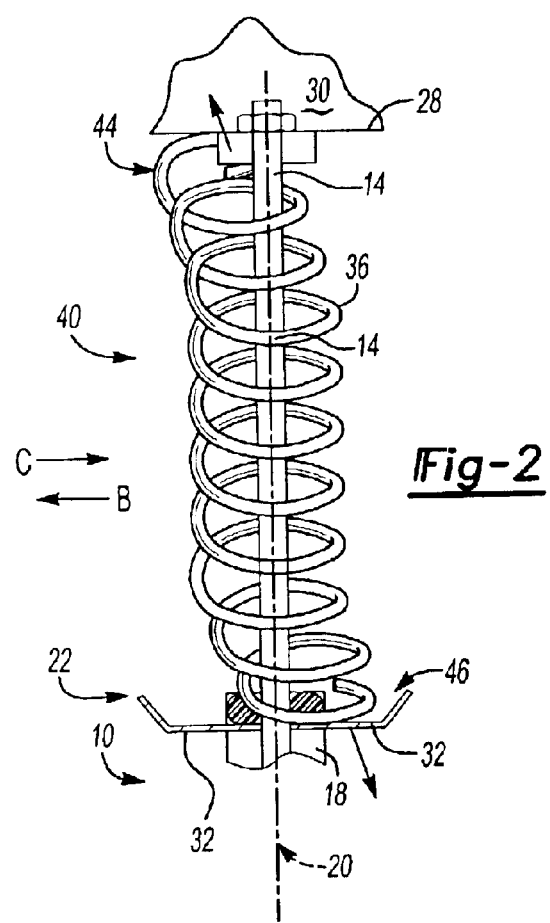
FIG. 2 illustrates the inventive strut assembly including spring and strut with the spring in an uncompressed state.
Figure 3A:
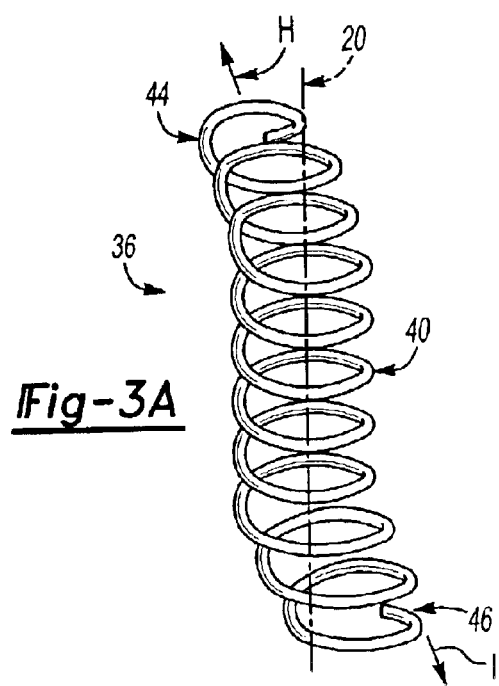
FIG. 3A illustrates the inventive spring of FIG. 2, showing the ends of the spring extending in opposite directions of the spring centerline.

FIG. 2 illustrates the inventive spring 36. Here, spring 36 creates a lateral force in the direction of arrow C to offset the lateral force experienced at the sealing interface 22 in the direction of arrow B. Spring 36 compresses along a spring centerline in the same direction as axis 20, which may also be the axis in which rod 14 extends from cylinder 18. However, in an uncompressed state as shown in FIGS. 2 and 3A, spring 36, such as a helical coil spring, has first end portion 44 extending in a direction transverse or lateral to axis 20 in a direction opposite to the extension of second end portion 46. Accordingly, spring 36 has two end portions 44, 46 extending in opposite directions of the spring centerline along axis 20. Thus, end portion 44 extends along the direction of arrow H while end portion 46 extends along the direction of arrow I. Both arrow H and arrow I extend in a direction transverse to axis 20.

Figure 3B:
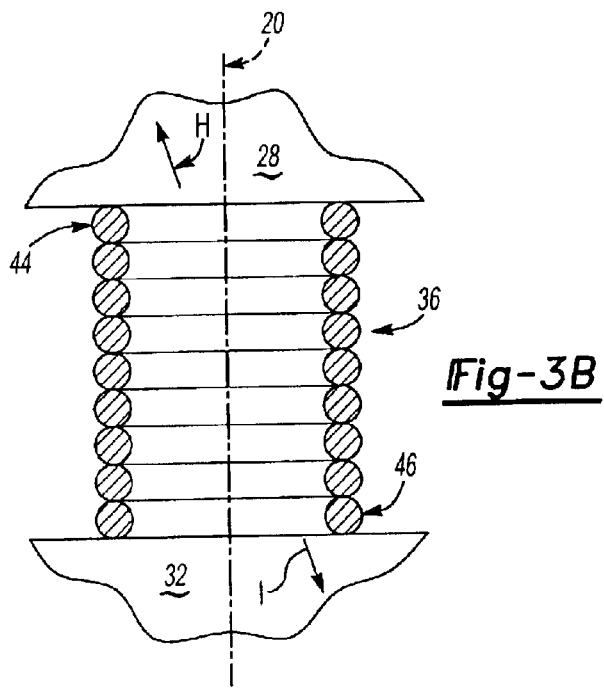
FIG. 3B illustrates the spring of FIG. 3A in a compressed state.
Figure 4:
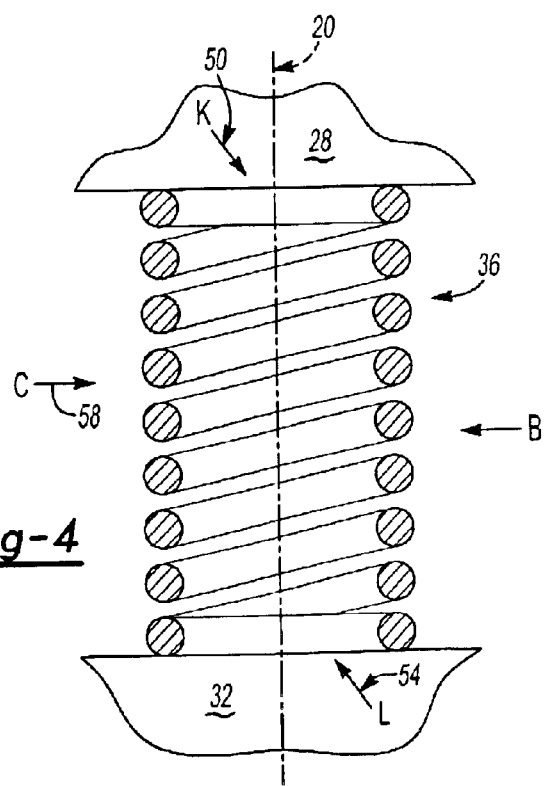
FIG. 4 illustrates a schematic force diagram of the inventive spring shown in FIG. 3B in a compressed state.

When spring 36 is compressed, first end portion 44 pushes against seat 28 along the direction of arrow H while second end portion 46 pushes against seat 32 along the direction of arrow I as shown in FIG. 3B. As shown in FIG. 4, in this compressed state, seat 28 creates a force along arrow K equal and opposite to the force created by spring 36 along arrow H. Similarly, seat 32 creates a force in the direction of arrow L, which is equal to and opposite to the force along arrow I. Force along arrow K has a lateral component along arrow C, which then offsets force experienced along arrow B. Force along arrow L has a lateral component along arrow B and may be used to adjust force along arrow K so that net force along arrow C minimizes force along arrow B experienced by strut 10 due to its position and geometry. By adjusting the angle of inclination of end portions 44 and 46 relative to axis 20, this lateral force along the direction of arrow C may be increased or decreased to accommodate for anticipated force along arrow B. Spring 36 may be manufactured in this way using known "hot forming" or "cold coiling" techniques.

Figure 5:
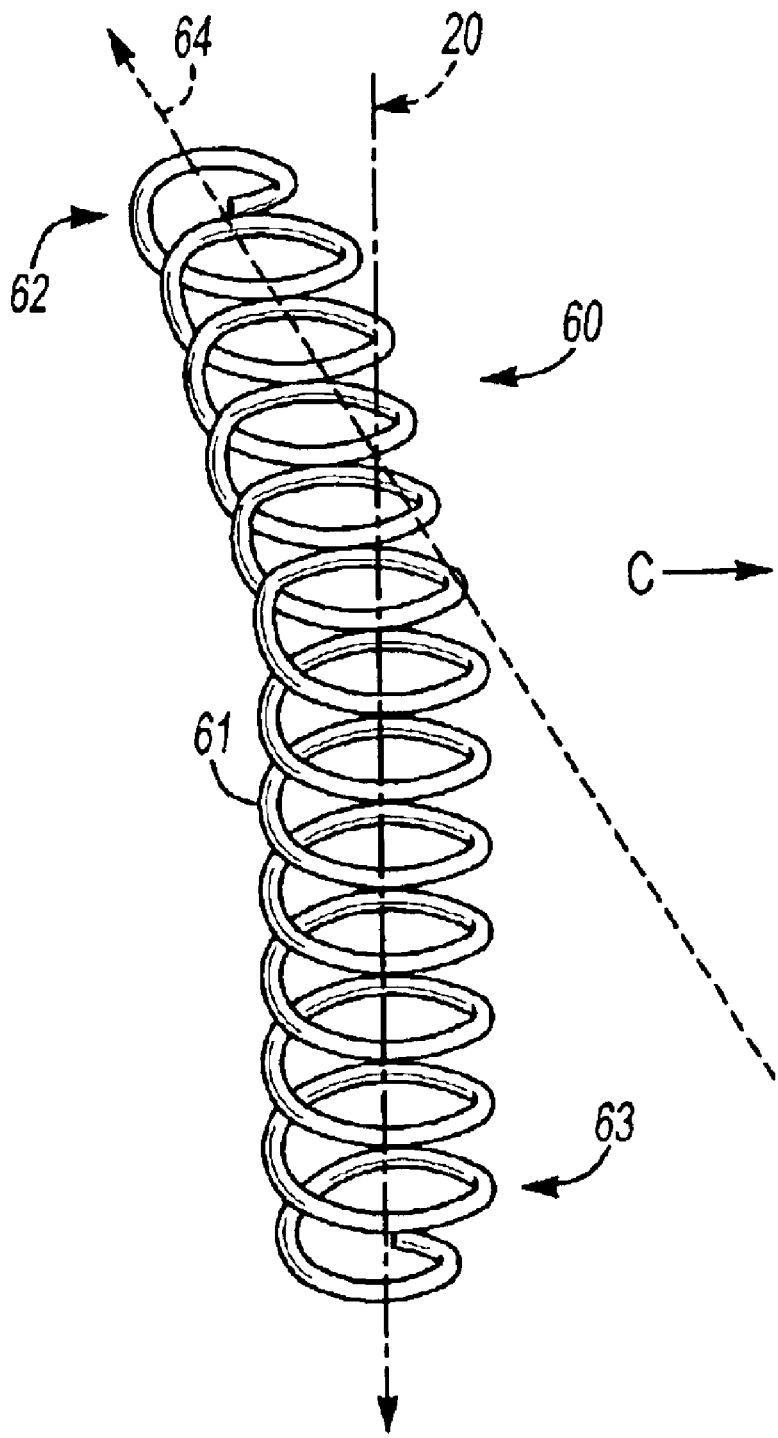
FIG. 5 illustrates another version of the inventive spring in an uncompressed state.

FIG. 5 illustrates another version of the inventive spring. Spring 60 comprises first end portion 62 and second end portion 63. As with the previous version, when spring 60 is in a compressed state, end portion 62, end portion 63 and middle portion 61 define a spring centerline 20. In an uncompressed state, end portion 62 extends along axis 64, which is transverse to axis 20. End portion 63 extends along axis 20. In this version, spring 60 creates lateral force along arrow C across axis 20 without a countervailing lateral force from end portion 63.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle strut assembly comprising:
   a strut;
   a first seat mounted to said strut;
   a second seat operatively mounted to a vehicle body; and
   a spring mounted between said first seat and said second seat and disposed around said strut, having a compressed state and an uncompressed state, said spring including a middle portion defining a spring centerline in said compressed state and end portions extending from said middle portion towards opposite sides of said spring centerline in said uncompressed state with said end portions concentric with said spring centerline in said compressed state.

2. The vehicle strut assembly of claim 1 wherein said strut extends along an axis and said spring creates a force transverse to said axis in said compressed state.

3. The vehicle strut assembly of claim 2 wherein said strut comprises a rod disposed in a cylinder having a sealing interface between said rod and said cylinder and said force offsets an opposing force experienced at said sealing interface.

4. The vehicle strut assembly of claim 1 wherein said spring comprises a coil spring.

5. The vehicle strut assembly of claim 1 wherein said middle portion defines said spring centerline in said uncompressed state.

6. A vehicle strut assembly comprising:
   a strut; and
   a spring operatively connected to said strut, having a compressed state and an uncompressed state, said spring including a middle portion defining a spring centerline in said compressed state and said uncompressed state and end portions extending from said middle portion towards opposite sides of said spring centerline in said uncompressed state.

7. A vehicle strut assembly comprising:
   a strut extending along an axis; and
   a spring operatively connected to said strut, said spring with a first end, a middle portion, and a second end, having a compressed state and an uncompressed state wherein said first end creates a first force and said second end creates an opposite second force in said compressed state, said first force and said second force transverse to an axis defined by said strut.

8. The vehicle strut assembly of claim 7 wherein said first force and said second force creates a net force lateral to said axis.

9. The vehicle strut assembly of claim 8 wherein said strut comprises a rod disposed in a cylinder having a sealing interface between said rod and said cylinder and said net force offsets an opposing force experienced at said sealing interface.

10. The vehicle strut assembly of claim 7 wherein said spring comprises a coil spring.

11. The vehicle strut assembly of claim 7 including a first seat mounted to said strut and a second seat mounted to a vehicle body wherein said spring is mounted between said first and said second seat.

12. The vehicle strut assembly of claim 7 wherein said middle portion defines a spring centerline, said first force and said second force transverse to said spring centerline.

* * * * *